Feb. 23, 1926.

A. F. MEYER 1,573,985

VALVE STRUCTURE

Filed June 20, 1921    3 Sheets-Sheet 1

Inventor
ADOLPH F. MEYER
BY Paul & Paul
His Attorneys

Inventor
ADOLPH F. MEYER
By Paul & Paul
His Attorneys

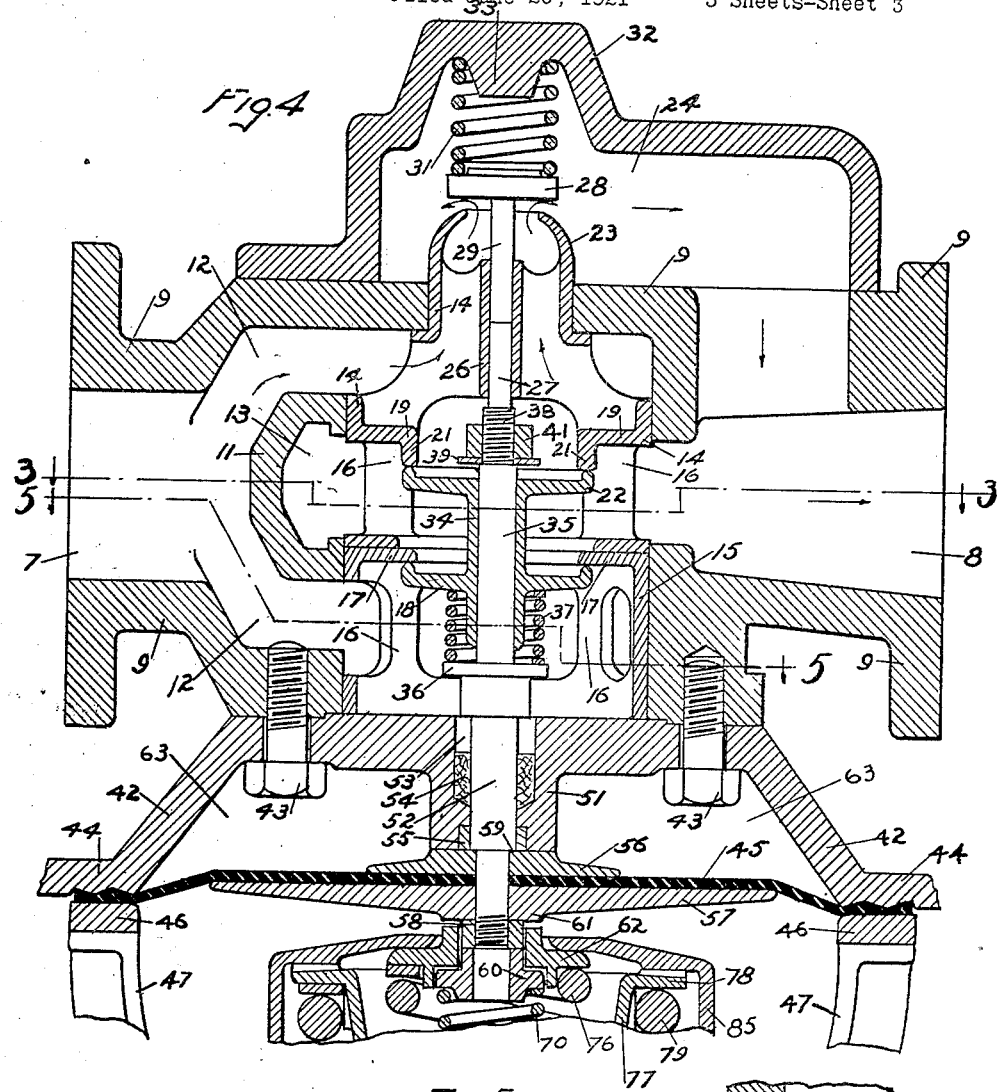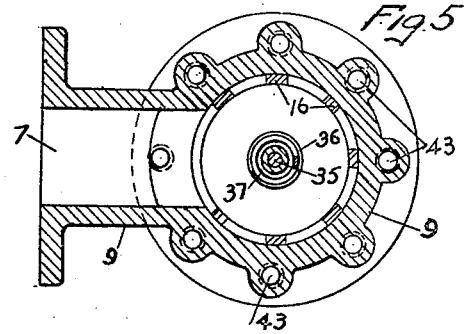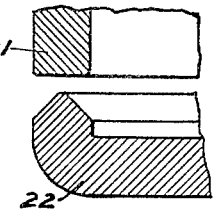

Patented Feb. 23, 1926.

1,573,985

UNITED STATES PATENT OFFICE.

ADOLPH F. MEYER, OF ST. PAUL, MINNESOTA.

VALVE STRUCTURE.

Application filed June 20, 1921. Serial No. 479,080.

*To all whom it may concern:*

Be it known that I, ADOLPH F. MEYER, a citizen of the United States, resident of St. Paul, Ramsey County, State of Minnesota, have invented certain new and useful Improvements in Valve Structures, of which the following is a specification.

This invention relates to improvements in valve structures for the control of fluid flow and pressure and particularly relates to such a valve structure that is sensitive and easily controlled and wherein the valves are statically and dynamically balanced and the discharge portions are shaped to reduce wear on the valve and to minimize or prevent the usual suction effects.

While this novel structure is obviously adapted to a wide variety of uses, there is here disclosed for purposes of explanation, a selected embodiment of the invention particularly adapted for use in combination with a speed-responsive member controlling the movements of the valve. This embodiment is useful in the wood-pulp grinding art as a means of governing the fluid flow and pressure and constitutes an improvement upon the valve structure so shown in the prior co-pending governor application of the inventor hereof, filed March 29, 1920, under Serial Number 369,604.

The object of the invention is to provide a new and useful valve structure.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Figure 4 is an enlarged detailed view of the valve structure in automatic-stop position;

Figure 5 is a cross-sectional view on the line 5—5 of Figure 4; and

Figure 6 is a greatly enlarged fragmentary view of the upper disk edge and seat.

Figure 1:
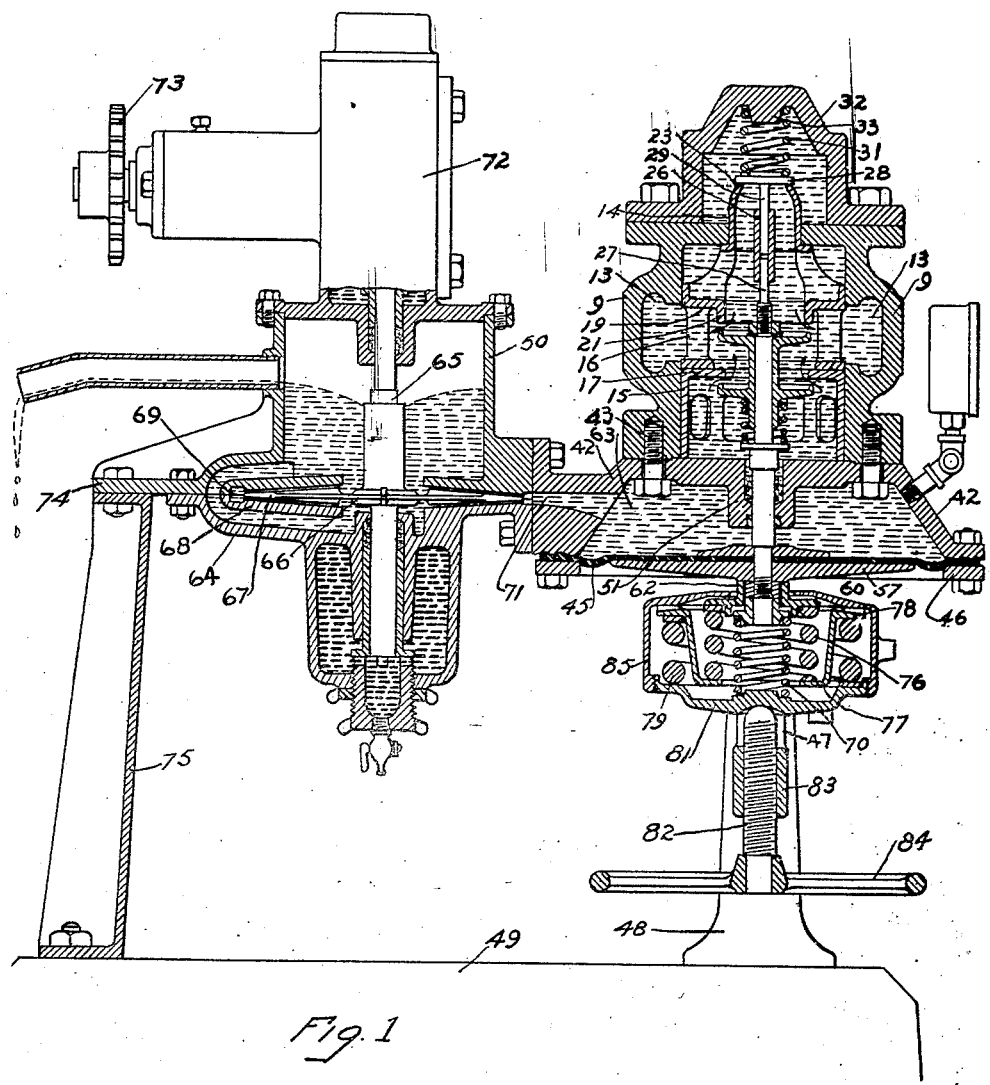
Figure 1 is a vertical sectional view (on the line 1—1 of Figure 2) through the valve structure and associated parts, with the valve in opened position.

In the form of the invention here disclosed, there is provided a fluid passage for a supply of fluid, such as water, under pressure, which fluid is controlled by the novel main valve. Furthermore, a by-pass is provided around such main valve and flow is controlled in this by-pass by an additional valve. This by-pass valve is co-operable with the first-mentioned main valve so that, when the main valve is open, the by-pass valve is always closed and, when the main valve is closed, the by-pass valve may be opened.

The control of flow through the fluid passage is preferably effected by means of a pair of main valves which is not only statically balanced, i. e. against the pressure of quiet water; but also dynamically balanced, i. e. against the pressure of water flowing through the pair and over their surfaces. The valves here shown are integral and in the form of a double-disk valve. In the usual construction of double-disk valves, a relatively broad cone-shaped valve portion is adapted to engage a cone-shaped seat. While these cone-shaped valves may be approximately balanced statically, they are not balanced dynamically and such double-disk valves can not be held in a position wherein they are open only a small amount, for example, a few hundredths of an inch, without suction effects being set up by the flow of water over the broad flat surfaces. This novel valve structure overcomes such disadvantages.

The fluid passage here disclosed is provided by what may be termed the inlet 7 and discharged 8 formed by the casting 9. This casting is also formed with a substantially central wall 11 which directs the water, supplied under pressure to the inlet 7, above and below the wall through the similar passages 12. The novel main valves are interposed between the upper and lower passages 12 and the substantially annular waterway 13 communicating with the discharge 8.

The main valves are preferably of the double-disk type and the two valve seats therefor are provided by a housing formed of the upper member 14 and the lower split member 15. These members are tightly fitted in central openings formed in the upper and lower portions of the casting forming the annular waterway 13. The major portions of the annular sides of these two valve-seat members are cut away leaving only the connecting webs 16. The lower split member 15 is provided, at its upper end, with an inwardly projecting annular flange 17 which, on its under face, presents a relatively broad flat surface which functions as the seat for the lower valve disk 18.

The upper member 14 is formed at its middle portion with an inwardly projecting annular flange 19 which has an annular downwardly projecting terminal portion 21 presenting a relatively broad flat annular surface which functions as the valve seat for the upper valve disk 22. The upper portion of the upper member 14 is formed with a substantially dome-shaped extension 23 which extends through the main casting 9 into a chamber 24 and terminally provides a narrow flat surface which functions as a seat for an auxiliary valve which may be here termed the automatic stop valve.

This upper member 14 is integrally formed with a central recessed bearing 26 for the reduced portion 27 of the main valve stem which is slidably mounted therein. This stem guides the movements, not only of the main double-disk valve, but also of the automatic stop valve.

Figures 2, 3:
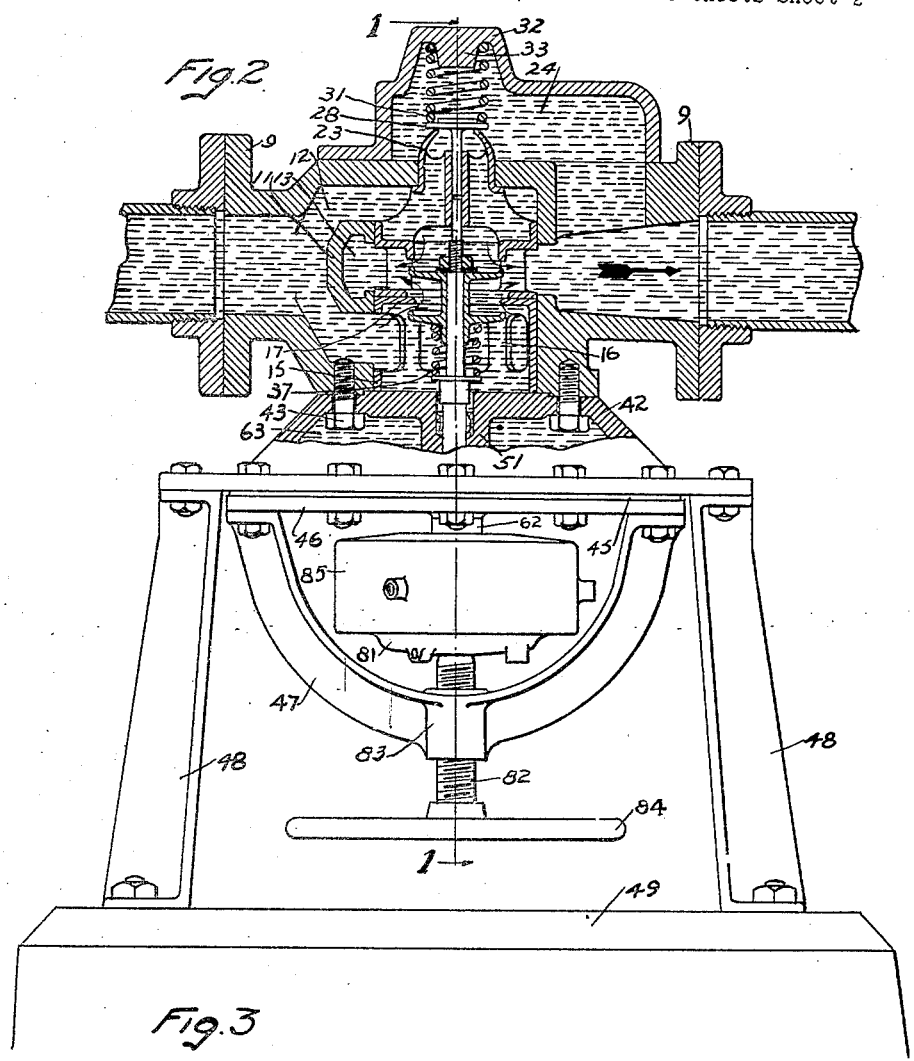
Figure 2 is a vertical and partly sectional view similar, but at right angles, to the view shown in Figure 1.
Figure 3 is a cross-sectional view on the line 3—3 of Figure 4.

The automatic stop valve comprises a flat disk 28 carried on a stem 29 slidably borne in the bearing 26. The disk 28 is normally downwardly pressed against its seat by means of the compression spring 31. The lower end of this spring rests upon the disk 28 while its upper end is held against the opposed inner face of the casting 32 which encloses the chamber 24 which opens into the discharge 8. The spring is held in position by means of a boss 33 adapted to project within the coils of the spring 31. As here shown, the double disk valves 18 and 22 are integrally formed and provided with an axial sleeve 34 having a longitudinal bore through which the enlarged portion 35 of the main valve stem passes. The main valve is thus loosely carried by the main valve stem. A collar 36 is formed on the stem and a compression spring 37 is held between the upper face of the collar 36 and the under face of the lower valve disk 18, so that the double disk valves are thereby tensionably held upwardly toward the closed seated position. The main valve stem has a threaded portion 38 above the portion 35. This threaded portion is of less diameter than the enlarged portion 35, so that a washer 39 may be seated against the resultant shoulder and held in such position by means of the nut 41. Thus, in the normal operating position, as shown in Figures 1 and 2, the double disk valve is tensionably pressed against the collar 39 by means of the compression spring 37. Thus, downward movement of the main valve stem causes the washer 39 to engage the double disk valves to move the two disks to downward open position, as shown in Figures 1 and 2. Normal upward movement of the main stem effects seating of both disks under tension of the compression spring 37. Further upward movement of the main valve stem, produced by springs 70 and 76 after seating of the main valve, causes the upper end of the such stem to engage and upwardly move the valve stem 29 of the automatic stop valve 28, whereby the valve 28 is moved to open position as shown in Figure 4 and permits full flow of water through the fluid passage.

The double disks 18 and 22 of the main valve are statically balanced by making them of uniform seating or contact-making diameter, but, in addition thereto, these disks are dynamically balanced. This is effected by providing both disks with sloping or rounded edges leading to a very narrow face or sharp edge at the point of discharge. The term "sharp edge", as here used to describe the seat-engaging portions of the double disk valve, is defined as signifying a face which substantially does not exceed one-thirty second ($\frac{1}{32}$) of an inch in width. This is approximately the width of the sharp edge used in the construction of what is known in hydraulics as a sharp-crested weir. The sheet of water flowing between the valve seat and the sharp edge of the valve is contracted at the entrance. The contact-making face or edge of the valve is so narrow that the sheet of water passes it in contracted form and does not touch the narrow contact-making face at all. Therefore, wear on the valve is minimized. Furthermore, as is shown in the enlarged view in Figure 4, the annular entrance and discharge sides of each valve adjacent its sharp edge are inclined toward the seats. This inclined or rounded approach causes the fluid gradually to be accelerated to the point of discharge, and the sharp edge or narrow face overcomes the usual suction effects, such as are produced by water flowing over a broad flat surface. Such suction effects are disadvantageous in that they unbalance valves dynamically, even though such valves are statically balanced.

For example, when it is desired to maintain the usual type of valve in a position wherein the valve is open a space of only a few hundredths of an inch, the suction effects produced by the flowing water cause unbalancing of the valve and movement from the desired position.

In the specific structure here disclosed, valve stem movement is controlled by elastic means straining to move the stem upwardly and by another means straining to move the stem downwardly. The upwardly straining means is here shown as several springs, while the downward straining is exerted by means of a speed-responsive mechanism. Such a speed-responsive mechanism is here shown as being of the centrifugal pump impeller type, the rotation of which is directly responsive to the speed of rotation of a turbo-grinder, to which the fluid discharged through this valve structure is supplied. This impeller functions to build up fluid pressure on one side of a partitioned chamber. The pressure is variable in proportion to the speed of rotation of the impeller. The valve stem is connected to such partition and the fluid pressure strains to move the partition and valve stem downwardly against the oppositely exerted force of the spring.

The pressure chamber is formed by the casting 42 to which the casting 9 of the fluid passage is secured by the bolts 43. The sides of the chamber casting 42 are downwardly inclined and terminate in an annular flange 44. A rubber diaphragm 45 extends completely across the lower side of the pressure chamber and is marginally secured between the annular flange 44 and a ring 46 which flange and ring are securely bolted together. A depending yoke 47 is held by bolts passing through the flange 44, the diaphragm 45 and the ring 46. The flange 44 is provided with integral extensions to which supporting legs 48 are bolted and by which legs the structure is supported upon a suitable foundation 49.

The chamber casting 42 is provided with a central depending boss 51 which is apertured slidably to receive the bearing portion 52 of the valve stem, this bearing portion being preferably slightly greater in diameter than the enlarged portion 35 of this same stem. This boss 51 is downwardly counterbored to provide an enlarged recess 53 wherein is positioned soft, porous packing 54, such as felt washers, partly filling this recess and constituting a novel form of gland construction. The lower end of this boss is upwardly counterbored to provide a recess for the bushing 55. This packing 54 is not compressed in the usual way but, nevertheless, prevents the fluid from flowing through the clearance space between the moving valve stem portion 52 and the bushing 55 at high velocity and thus minimizes the wear on these parts while, at the same time, practically eliminating the friction caused by the ordinary gland construction. It should also be noted, that the soft porous packing 54 permits the escape of water therepast, but prevents the passage of fine grit or small particles of sand, dirt, or similar impurities which not only would result in frictional loss but also in added excessive wear of the parts.

A small disk 56 is positioned upon the upper face of the diaphragm, while the larger disk 57 is positioned against the under face of the diaphragm, and the valve stem extends through both disks and the intermediate diaphragm. The lower end of the valve stem is threaded and bears thereon a nut 58, whereby the two disks and included diaphragm are held together and against the downwardly presented shoulder 59 of the valve stem. The central portion of the under side of the large diaphragm disk 57 is formed with a boss 61 which rests upon the resiliently held spring seat 62 in the operating position shown in Figures 1 and 2. This seat is under spring tension to resist downward movement of the main stem as will hereafter be described.

The pressure chamber 63 is filled with a fluid such as water, the pressure of which is caused to vary in proportion to the speed of rotation of the impeller. This impeller is provided with a housing 64 which upwardly provides a water reservoir. This housing is bolted to the casting 42. The impeller is provided with a stem 65 rotatably mounted in the housing 50 and having suitably packed bearings to prevent escape of water. The stem carries a disk 66 bearing radially projecting vanes 67. An annular way, within which the disk and vanes rotate, is provided by the integral casting portion 68. A peripheral end portion of the way is provided with an annular passage 69 which communicates with a port 71 leading to the pressure chamber. The function of this impeller is to create pressure. There is merely an intermittent slight flow produced by the impeller as the diaphragm 45 moves up and down in response to pressure variations in the chamber 63. Suitable gearing, carried in the gear box 72 functions to rotate the impeller shaft 65 upon rotation of the gear 73. The upper portion of the impeller housing is provided with an integral extension 74 to which is bolted the third supporting leg 75 of this novel structure. The lower portion of the impeller housing is provided with a depending portion affording a guide bearing and lubricating mechanism for the impeller shaft 65.

The novel form of spring device, here shown, is substantially that shown and disclosed in the prior application of the inventor hereof, filed December 31, 1920, Serial Number 430,382.

The nut 58, secured to the main valve stem, is engaged by a spring-seat 60 upwardly held thereagainst under constant tension of the spring 70 held between the under side of the spring-seat 60 and the base 81 of the spring housing which in turn is borne by the threaded stem 82 received in adjustable threaded engagement in the central boss 83 provided by the yoke 47. The threaded stem 82 bears a hand-wheel 84 by means of which the tension of the spring device may be adjusted. The main valve stem is thus under constant tension upwardly tending to move the stem in opposition to any downwardly tending diaphragm pressure.

The spring-seat 62 is mounted upon the upper portion of a compression spring 76 which is in turn supported by means of the hanger 77 having, adjacent its upper end, an outwardly flaring flange 78 supported by the relatively softer but initially compressed spring 79 positioned upon the base 81 of the spring housing. This outer spring 79 is initially compressed and constrained by rotating the spring cover 85 with relation to the base 81. As the cover and base are in threaded engagement, the cover may thereby be downwardly drawn whereby the hanger 78 is depressed by the cover to constrain the spring 79 against the upper face of the base 81.

This novel spring construction is such that the larger the downward pressure on the diaphragm becomes, the greater will become the rate of deflection of the spring; that is, equal load increments produce greater deflection increments above a given load. It will be noted that the outer spring 79 is constrained after being given a desired amount of initial compression or load; while the inner springs 70 and 76 are substantially free. This is, in substance, a two-stage spring. The initial rate of deflection is determined by the characteristics of the inner or free springs 70 and 76. The second stage or increased rate of deflection begins at the point where the total load on the spring 76 equals the initial compression or load on the outer spring 79. The final rate of deflection is determined by the characteristics of the three springs acting together.

During normal operation with pressure in the chamber 63, the diaphragm may occupy a position such as that shown in Figure 1, wherein the diaphragm lower disk 57 downwardly forces the spring-seat 62 against the tension of the spring 76. Such downward diaphragm movement also downwardly forces the main valve stem, and the nut 41 and collar 39 positively and downwardly move the double disk valve to an open position corresponding to the pressure in the chamber 63. When the downward pressure or diaphragm load exceeds an adjustably predetermined amount, the spring-seat 62 enters the second stage and has the increased rate of deflection. When such second stage is entered, the double disk valve is forced open a greater distance for equal load increments. On the other hand, when the pressure in the chamber 63 drops, the main valve stem is forced upwardly at a relatively rapid rate during the second stage and thereafter moves relatively more slowly during the first stage. The double disk valve, during these two stages, moves with the main valve stem as the valve is tensionably held against the collar 39 by the coil spring 37. When the double disk valve reaches closed position, the main valve stem may overtravel, upon further pressure drop in the chamber 63. Such overtravel of the main valve stem is shown in Figure 4, wherein the lower diaphragm disk 57 has been raised above the spring-seat 62 until the upper diaphragm disk 56 abuts against the boss 51 of the chamber casting 42. In reaching such position the spring 70 upwardly moves the main valve stem, terminally to engage the stem 29 of the auxiliary or automatic stop-valve 28, whereby the valve 28 is opened and the fluid may freely flow through the by-pass to the discharge 8.

I claim as my invention:

1. A valve structure including a fluid passage, a main valve adapted to close the passage, a by-pass around said main valve, a second valve to close the by-pass, and controlling means to move the main valve to open and closed position and adapted, upon further movement after closure of the main valve, to open the by-pass valve.

2. A valve structure including a fluid passage, a valve stem movably mounted in said structure, a main valve adapted to close the passage, means to mount the main valve on the stem whereby the valve may be moved by the stem to open and closed position, said means being adapted resiliently to permit overtravel of the stem after closure of the main valve, a by-pass around said main valve, a valve to close the by-pass, and said by-pass valve being arranged to be moved to open position upon said overtravel of the main valve stem.

3. A valve structure including a fluid passage, a valve stem movably mounted in said structure, a main valve slidably mounted on the stem and adapted to close the passage, an abutment on the stem, resilient means to hold the valve against the abutment, whereby the valve may be moved by the stem to open and closed position and the stem thereby permitted to overtravel after closure of the main valve, a by-pass around the main valve, a valve to close the by-pass, and said by-pass valve being arranged to be moved to open position upon said overtravel of the main valve stem.

4. A valve structure including a fluid passage, valve seats therein, a statically balanced main valve to engage said seats, a by-pass around said seats, a valve to close the by-pass, and means to open and close the balanced main valve, said means being adapted, upon further movement after closure of the balanced valve, to open the by-pass valve.

5. A valve structure including a fluid passage, a wall in the passage having two opposed openings therethrough, a valve seat around each opening, a stem extending through both openings, a statically balanced valve slidably mounted on the stem and adapted resiliently to seat upon the valve seats, means to move the stem to open and close the balanced valve, a by-pass in said passage, a valve to open and close the by-pass, means normally holding the by-pass valve in closed position, and means adapted, upon further movement of said stem after closure of the balanced main valve, to cause opening of the by-pass valve.

6. A valve structure including a fluid passage, valves to close the passage, means yieldably to hold the valves in passage-closing position, pressure means operably connected to the valves and adapted to open the passage upon pressure increase above a predetermined point, and means adapted upon failure of said pressure to open said passage.

7. A valve structure including a fluid passage, a plurality of valve seats in said passage, valves co-operable with said seats, means yieldably to hold the valves in seated passage-closing position, pressure means operably connected to the valves and adapted to open the passage upon pressure increase above a predetermined point, and means adapted upon failure of said pressure to open said passage.

8. A valve structure including a fluid passage, valves to close the passage, means yieldably to hold the valves in passage-closing position, means connected to the valves and operable by fluid pressure to open the passage substantially proportionately to increase of pressure, and means operable, upon failure of said pressure, freely to open said passage.

In witness whereof, I have hereunto set my hand this 17th day of June, 1921.

ADOLPH F. MEYER.